United States Patent
Tie et al.

(10) Patent No.: US 11,419,142 B2
(45) Date of Patent: Aug. 16, 2022

(54) DATA TRANSMISSION METHOD AND COMMUNICATIONS APPARATUS

(71) Applicant: Huawei Technologies Co., Ltd., Shenzhen (CN)

(72) Inventors: Xiaolei Tie, Shanghai (CN); Zhihu Luo, Beijing (CN); Jun Li, Shanghai (CN); Zhe Jin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/095,491

(22) Filed: Nov. 11, 2020

(65) Prior Publication Data

US 2021/0068150 A1   Mar. 4, 2021

Related U.S. Application Data

(63) Continuation of application No. PCT/CN2019/086614, filed on May 13, 2019.

(30) Foreign Application Priority Data

May 11, 2018   (CN) .......................... 201810451021.3

(51) Int. Cl.
   *H04W 74/08*   (2009.01)
   *H04W 74/00*   (2009.01)
   *H04W 72/12*   (2009.01)

(52) U.S. Cl.
   CPC ..... *H04W 74/008* (2013.01); *H04W 72/1268* (2013.01); *H04W 74/0833* (2013.01)

(58) Field of Classification Search
   CPC ... H04W 8/08; H04W 74/00; H04W 72/1268; H04W 74/08; H04W 74/008; H04W 74/0833; H04W 72/1278
   See application file for complete search history.

(56) References Cited

U.S. PATENT DOCUMENTS

2015/0341803 A1* 11/2015 Kim ................. H04W 72/0453
                                                         370/252

FOREIGN PATENT DOCUMENTS

CN    103209062 A    7/2013
CN    106455093 A    2/2017
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 14)," 3GPP TS 36.211 V14.6.0, pp. 1-196, 3rd Generation Partnership Project, Valbonne, France (Mar. 2018).

(Continued)

*Primary Examiner* — Anez C Ebrahim
(74) *Attorney, Agent, or Firm* — Leydig, Voit & Mayer, Ltd.

(57) ABSTRACT

A data transmission method and a communications apparatus are described that reduce complexity and overhead of data reception performed by a base station. The method includes receiving information about a repetition quantity R1 corresponding to Tmax, where Tmax is a maximum transport block size allowed to be used to transmit data. The method further includes determining a cyclic parameter L based on R1, where the cyclic parameter L indicates that content carried in each of a plurality of time units to which a transport block used to transmit the data is mapped is repeated in L consecutive time units, and wherein a size of the transport block actually used to transmit the data is Ts, and Ts is less than a maximum transport block size (Tmax). The method further includes transmitting the data based on the cyclic parameter L.

20 Claims, 8 Drawing Sheets

(56) References Cited

FOREIGN PATENT DOCUMENTS

| CN | 106961317 A | 7/2017 |
|---|---|---|
| CN | 107046453 A | 8/2017 |
| WO | 2017157115 A1 | 9/2017 |

OTHER PUBLICATIONS

"3rd Generation Partnership Project; Technical Specification Group Radio Access Network; Evolved Universal Terrestrial Radio Access (E-UTRA); Physical layer procedures (Release 14)," 3GPP TS 36.213 V14.4.0, Total 462 pages, 3rd Generation Partnership Project, Valbonne, France (Sep. 2017).

"3rd Generation Partnership Project; Technical Specification Group Core Network and Terminals; Non-Access-Stratum (NAS) protocol for Evolved Packet System (EPS); Stage 3 (Release 15)," 3GPP TS 24.301 V15.2.0, pp. 1-515, 3rd Generation Partnership Project, Valbonne, France (Mar. 2018).

"Data transmission during random access procedure for NB-IoT," 3GPP TSG-RAN WG1 Meeting #92bis, R1-1804155, Sanya, China, pp. 1-5, 3rd Generation Partnership Project, Valbonne, France (Apr. 16-20, 2018).

"3rd Generation Partnership Project; Technical Specification Group Radio Access Network; Evolved Universal Terrestrial Radio Access (E-UTRA); Physical layer procedures (Release 15)," 3GPP TS 36.213 V15.1.0, Total 499 pages, 3rd Generation Partnership Project, Valbonne, France (Mar. 2018).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.1.0, pp. 1-341, 3rd Generation Partnership Project, Valbonne, France (Mar. 2018).

"3rd Generation Partnership Project; Technical Specification Group Radio Access Network; Evolved Universal Terrestrial Radio Access (E-UTRA); Medium Access Control (MAC) protocol specification (Release 15)," 3GPP TS 36.321 V15.1.0, pp. 1-109, 3rd Generation Partnership Project, Valbonne, France (Mar. 2018).

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.6.2, pp. 1-766, 3rd Generation Partnership Project, Valbonne, France (Apr. 2018).

"Early data transmission for MTC," 3GPP TSG-RAN WG1 Meeting #92bis, R1-1804121, Sanya, China, pp. 1-5, 3rd Generation Partnership Project, Valbonne, France (Apr. 16-20, 2018).

CATT, "NB-PUSCH/NB-PDSCH coding and repetition for NB-IoT," 3GPP TSG RAN WG1 NB-IoT Ad-Hoc Meeting, Sophia Antipolis, France, R1-161955, total 4 pages. 3rd Generation Partnership Project, Valbonne, France (Mar. 22-24, 2016).

JP/2020-563665, Notice of Reasons for Rejection, dated Jan. 25, 2022.

* cited by examiner

DATA TRANSMISSION METHOD AND COMMUNICATIONS APPARATUS

CROSS-REFERENCE TO RELATED APPLICATIONS

This application is a continuation of International Application No. PCT/CN2019/086614, filed on May 13, 2019, which claims priority to Chinese Patent Application No. 201810451021.3, filed on May 11, 2018. The disclosures of the aforementioned applications are hereby incorporated by reference in their entireties.

TECHNICAL FIELD

This application relates to the field of communications technologies, and in particular, to a data transmission method and a communications apparatus.

BACKGROUND

In a data transmission process, because a network side usually cannot learn of a transport block size (TBS) required by a terminal to transmit data, the network side usually notifies the terminal of a maximum TBS (denoted as Tmax) that the terminal is allowed to use to transmit the data. A TBS actually used by the terminal (denoted as Ts) to transmit the data may be less than Tmax. To avoid a waste of resources and reduce power consumption of the terminal, the network side usually supports the terminal in selecting a Ts less than Tmax to transmit the data. Due to diversity of data transmission on an existing network, in the foregoing scenario, how to minimize processing complexity of a network device is a problem to be resolved.

SUMMARY

This application provides a data transmission method and an apparatus, to reduce complexity and overheads of data reception performed by a network device.

According to a first aspect, this application provides a data transmission method. The method includes: receiving information about a repetition quantity (R1) corresponding to Tmax, where Tmax is a maximum transport block size allowed to be used to transmit data; determining a cyclic parameter (L) based on R1, where the cyclic parameter L indicates that content carried in each of a plurality of time units to which a transport block used to transmit the data is mapped is repeated in L consecutive time units, and wherein a size of the transport block used to transmit the data is Ts, and Ts<Tmax; and transmitting the data based on the cyclic parameter L.

According to the data transmission method provided in this application, the cyclic parameter L may be determined based on R1 indicated by a network device, so that values of L are the same regardless of a value of Ts used by a terminal device to transmit the data, and the network device does not need to assume different cyclic parameters L to process received data. This reduces processing complexity and receiving overheads of the network device in a process of receiving the data.

Optionally, before the transmitting the data based on the cyclic parameter L, the method further includes: determining R2 based on Ts, R1, and L, where R2 is an integer multiple of L, and R2 is a total quantity of repeated transmissions of the content carried in each time unit when the data is sent. The transmitting the data based on the cyclic parameter L includes: transmitting the data based on the cyclic parameter L and R2.

In this optional manner, a calculated actual repetition quantity R2 of the transport block whose size is Ts is an integer multiple of L. This can ensure that the terminal device sends the data for a plurality (R2/L) of complete sending cycles, and improve data transmission efficiency.

Optionally, the receiving information about a repetition quantity R1 corresponding to Tmax includes: receiving a random access response RAR message, where the information about R1 is carried in the RAR message. The transmitting the data based on the cyclic parameter L includes: transmitting the data through a third message, namely, an MSG 3, during a random access procedure based on the cyclic parameter L.

According to a second aspect, this application provides a data transmission method. The method includes: sending, to a terminal device, information about a repetition quantity R1 corresponding to Tmax, where Tmax is a maximum transport block size allowed to be used; determining a cyclic parameter L based on R1, where the cyclic parameter L indicates that content carried in each of a plurality of time units to which a transport block used to transmit data is mapped is repeated in L consecutive time units, and wherein a size of the transport block used to transmit the data is Ts, and Ts<Tmax; and receiving the data based on the cyclic parameter L.

According to the data transmission method provided in this application, the cyclic parameter L used by the terminal device may be determined based on R1 indicated by a network device, so that values of L are the same regardless of a value of Ts used by the terminal device to transmit the data, and the network device does not need to assume different cyclic parameters L to process received data. This reduces processing complexity and receiving overheads of the network device in a process of receiving the data.

Optionally, before the receiving the data based on the cyclic parameter L, the method further includes: determining R2 based on Ts, R1, and L, where R2 is an integer multiple of L, and R2 is a total quantity of repeated transmissions of the content carried in each time unit when the terminal device sends the data. The receiving the data based on the cyclic parameter L includes: receiving the data based on the cyclic parameter L and R2.

In this optional manner, a calculated actual repetition quantity R2 of the transport block whose size is Ts is an integer multiple of L. This can ensure that the terminal device sends the data for a plurality (R2/L) of complete sending cycles, and improve data transmission efficiency.

Optionally, the sending, to a terminal device, information about a repetition quantity R1 corresponding to Tmax includes: sending a random access response (RAR) message to the terminal device, where the information about R1 is carried in the RAR message. The receiving the data based on the cyclic parameter L includes: receiving the data through a third message, namely, an MSG 3, during a random access procedure based on the cyclic parameter L.

With reference to the first aspect or the second aspect, optionally, the determining a cyclic parameter L based on R1 satisfies L=min (K, $\lceil R1/2 \rceil$), where min represents taking a minimum value, K is a preset constant, and $\lceil\ \rceil$ represents rounding up.

Optionally, the determining R2 based on Ts, R1, and L satisfies R2=(L*⌈f(Ts,R1)/L⌉), where ⌈ ⌉ represents rounding up.

Optionally, f(Ts,R1) satisfies f(Ts,R1)=(Ts/Tmax)*R1.

According to a third aspect, a data transmission method is provided. The method includes: receiving information about a repetition quantity R1 corresponding to Tmax, where Tmax is a maximum transport block size allowed to be used to transmit data; determining R2 based on Ts, R1, and a cyclic parameter L, where R2 is an integer multiple of L, the cyclic parameter L indicates that content carried in each of a plurality of time units to which a transport block used to transmit the data is mapped is repeated in L consecutive time units, R2 is a total quantity of repeated transmissions of the content carried in each time unit when the data is sent, a size of the transport block used to transmit the data is Ts, Ts<Tmax, and R2<R1; and sending the data based on R2.

According to the data transmission method provided in this application, a method for reducing the repetition quantity R1 is provided, so that when Ts is less than Tmax, a terminal device can reduce R1 to obtain R2 (where R2<R1), to reduce sending power consumption of the terminal.

According to a fourth aspect, this application provides a data transmission method. The method includes: sending, to a terminal device, information about a repetition quantity R1 corresponding to Tmax, where Tmax is a maximum transport block size allowed to be used to transmit data; calculating R2 based on Ts, R1, and a cyclic parameter L, where R2 is an integer multiple of L, the cyclic parameter L indicates that content carried in each of a plurality of time units to which a transport block used to transmit the data is mapped is repeated in L consecutive time units, R2 is a total quantity of repeated transmissions of the content carried in each time unit when the data is sent, a size of the transport block used to transmit the data is Ts, Ts<Tmax, and R2<R1; and receiving the data based on R2.

According to the data transmission method provided in this application, a method for reducing the repetition quantity R1 is provided, so that when Ts is less than Tmax, the terminal device can reduce R1 to obtain R2 (where R2<R1), to reduce sending power consumption of the terminal.

With reference to the third aspect and the fourth aspect, optionally, the determining R2 based on Ts, R1, and L satisfies R2=(L*⌈f(Ts,R1)/L⌉), where ⌈ ⌉ represents rounding up.

Optionally, f(Ts,R1) satisfies f(Ts,R1)=(Ts/Tmax)*R1.

Optionally, a value of the cyclic parameter L is fixed, or is determined based on R1.

Optionally, determining the cyclic parameter L based on R1 satisfies L=min (K,⌈R1/2⌉), where min represents taking a minimum value, K is a preset constant, and ⌈ ⌉ represents rounding up.

In this optional manner, an actual repetition quantity, calculated according to a preset scaling rule, of the transport block whose size is Ts is an integer multiple of L. This can ensure that the terminal device sends the data for a plurality (R2/L) of complete sending cycles, and improve data transmission efficiency.

According to a fifth aspect, a communications apparatus is provided. The communications apparatus has functions of implementing the terminal device in the method designs of the first aspect or the third aspect. The functions may be implemented by hardware, or may be implemented by hardware executing corresponding software. The hardware or the software includes one or more units corresponding to the foregoing functions.

According to a sixth aspect, a communications apparatus is provided. The communications apparatus has functions of implementing the network device in the method designs of the second aspect or the fourth aspect. The functions may be implemented by hardware, or may be implemented by hardware executing corresponding software. The hardware or the software includes one or more units corresponding to the foregoing functions.

According to a seventh aspect, a communications apparatus is provided, including a processor and a memory. The memory is configured to store a program or instructions. The processor is configured to invoke the program or the instruction from the memory and run the program or the instruction, so that the communications apparatus performs the method according to the first aspect or the third aspect.

Optionally, the communications apparatus may further include a transceiver, configured to support the communications apparatus in sending and receiving data, signaling, or information in the method according to the first aspect, for example, receiving the information about R1 or sending the data.

Optionally, the communications apparatus may be a terminal device, or may be a part of an apparatus in a terminal device, for example, a chip system in the terminal device. Optionally, the chip system is configured to support the terminal device in implementing functions in the foregoing aspects, for example, generating, receiving, sending, or processing data and/or information in the foregoing methods. In a possible design, the chip system further includes a memory, and the memory is configured to store a program instruction and data that are necessary for the terminal device. The chip system includes a chip, and may further include another discrete device or circuit structure.

According to an eighth aspect, a communications apparatus is provided, including a processor and a memory. The memory is configured to store a program or instructions. The processor is configured to invoke the program or the instructions from the memory and run the program or the instructions, so that the communications apparatus performs the method according to the second aspect or the fourth aspect.

Optionally, the communications apparatus may further include a transceiver, configured to support the communications apparatus in sending and receiving data, signaling, or information in the method according to the second aspect, for example, sending the information about R1 or receiving the data.

Optionally, the communications apparatus may be a network device, or may be a part of an apparatus in a network device, for example, a chip system in the network device. Optionally, the chip system is configured to support the network device in implementing functions in the foregoing aspects, for example, generating, receiving, sending, or processing data and/or information in the foregoing methods. In a possible design, the chip system further includes a memory, and the memory is configured to store a program instruction and data that are necessary for the network device. The chip system includes a chip, and may further include another discrete device or circuit structure.

According to a ninth aspect, this application provides a computer storage medium. The computer storage medium stores instructions. When the instructions are run on a computer, the computer is enabled to implement the data transmission method according to the first aspect, the optional manners of the first aspect, the second aspect, the optional manners of the second aspect, the third aspect, the optional manners of the third aspect, the fourth aspect, or the optional manners of the fourth aspect.

According to a tenth aspect, this application provides a computer program product including instructions. When the computer program product runs on a computer, the computer is enabled to implement the data transmission method according to the first aspect, the optional manners of the first aspect, the second aspect, the optional manners of the second aspect, the third aspect, the optional manners of the third aspect, the fourth aspect, or the optional manners of the fourth aspect.

DESCRIPTION OF EMBODIMENTS

The term "and/or" in this specification indicates that three relationships may exist. For example, A and/or B may indicate the following three cases: Only A exists, both A and B exist, and only B exists.

A data transmission method provided in this application may be applied to an LTE system, a long term evolution-advanced (LTE advanced, LTE-A) system, and a subsequent evolved system of the LTE system, for example, a fifth generation (5G) communications system, a new radio (NR) system, and a next-generation wireless local area network system.

Figure 1:
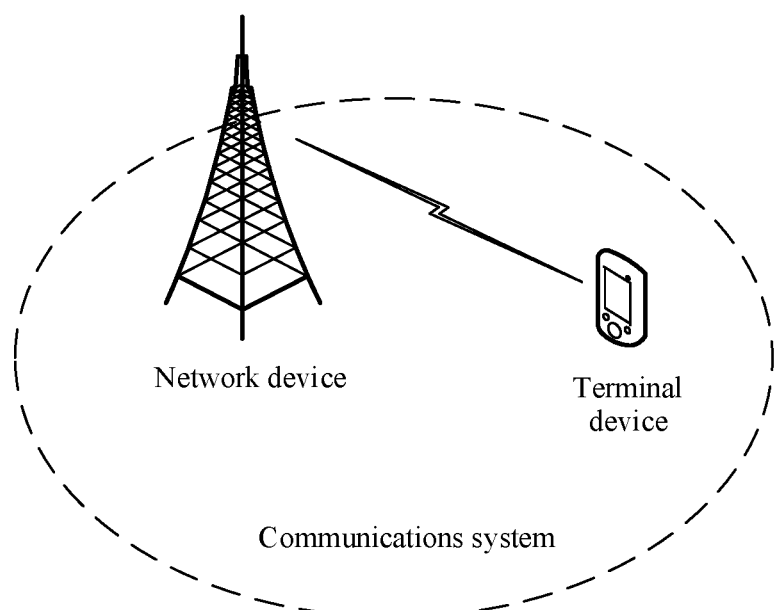
FIG. 1 is a schematic diagram of a communications system according to this application.

For example, FIG. 1 is a schematic diagram of a communications system according to this application. The data transmission method provided in this application may be applied to any communications system including at least one network device and at least one terminal device. The network device may be a base station (BS) or a base transceiver station device (BTS), and is an apparatus deployed on a radio access network and configured to provide a wireless communication function for the terminal device. In systems using different wireless access technologies, a device having a base station function may have different names. For example, the device is referred to as an evolved NodeB (eNB or eNodeB) on an LTE network, a NodeB on a third generation (3G) communications network, a gNB applied to a fifth generation communications system, or the like. For ease of description, the foregoing devices having the base station function are collectively referred to as the network device in this application.

The terminal device in this application may include various handheld devices, vehicle-mounted devices, wearable devices, computing devices, smartphones, smartwatches, tablet computers, and the like that have a wireless communication function. For ease of description, the foregoing devices are collectively referred to as the terminal device in this application.

The data transmission method provided in this application is applicable to a data transmission scenario: The network device cannot learn of a transport block size required by the terminal device to transmit data, and therefore, broadcasts a fixed maximum transport block size (TBS) through a system message to indicate a maximum transport block size (denoted as Tmax) that the terminal device is allowed to use to transmit the data.

In this scenario, the terminal device usually sends the data in a cyclic repetition transmission mode. This transmission mode is related to two parameters: a repetition quantity R and a cyclic parameter L. R is a total quantity of repeated transmissions of content carried in each of a plurality of (assumed to be X) time units to which a transport block (TB) used by the terminal device to transmit the data is mapped. R may be understood as a total quantity of repeated transmissions of the transport block used to transmit the data.

L indicates that the content carried in each time unit is repeated in L consecutive time units. Specifically, when sending the data based on R, after mapping the transport block to the X time units, the terminal device does not repeat, for R times, one sending cycle of the X time units carrying different content. Instead, the content carried in each of the X time units is first repeated in the L consecutive time units, information in the X time units is sent in one sending cycle of X*L time units, and then the sending cycle is repeated for $\lfloor R/L \rfloor$ times, where $\lfloor \ \rfloor$ represents rounding down. It should be noted herein that redundancy versions (RV) of different sending cycles may be different. For example, an RV of a $j^{th}$ sending cycle is $rv_{idx}(j)=2g$ mod $(rv_{DCI}+j,2)$, where $rv_{DCI}$ is an initial RV, and may be indicated in a random access response (RAR) or downlink control information (DCI).

In the prior art, a value of L is determined based on the repetition quantity R actually used by the terminal device, and a relationship between R and L satisfies $L=\min(4, \lceil R1/2 \rceil)$, where $\lceil \ \rceil$ represents rounding up.

A cyclic repetition sending mode on a narrowband physical uplink shared channel (NPUSCH) in a narrowband internet of things (NB-IOT) is used as an example. A transport block (or a codeword) corresponding to the NPUSCH is mapped to $N_{RU}$ resource units (RU), and one of the $N_{RU}$ RUs corresponds to $N_{slots}^{UL}$ slots in terms of time. Therefore, content of one NPUSCH transport block is mapped to $N_{RU}*N_{slots}^{UL}$ slots.

It is assumed that R1 is a repetition quantity R indicated by a network device, and R2 is an actual total repetition quantity corresponding to selected Ts. A cyclic parameter L is calculated based on R2: $L=\min(4, \lceil R2/2 \rceil)$ When a terminal device sends data based on the cyclic parameter L and R2, the NPUSCH transport block is finally sent in N consecutive NB-IoT uplink slots, where $N=R2*N_{RU}*N_{slots}^{UL}$. For ease of description, the N consecutive uplink slots are numbered and denoted as Ni, where i=0, 1, 2, 3, . . . , or N. During sending, the N slots are divided into R2/L groups, and each group includes B consecutive uplink slots, where $B=L*N_{RU}*N_{slots}^{UL}$. Content that is of the NPUSCH transport block and that is mapped to a $\lfloor \frac{b}{L} \rfloor^{th}$ slot (where b=0, 1, 2, ..., or B−1) is sent in L uplink slots, and numbers corresponding to the L uplink slots Ni are $$i = jB + 2L\left\lfloor\frac{b}{2L}\right\rfloor + 2l + \mathrm{mod}\left(\left\lfloor\frac{b}{L}\right\rfloor, 2\right), l = 0, 1, \ldots, L-1.$$

Corresponding to this application, in the foregoing example, the NPUSCH transport block is mapped to X time units, where the time unit is two slots (that is, one subframe), and X is $$\left\lfloor\frac{B}{2L}\right\rfloor.$$

One sending cycle corresponds to one group in this example. Content carried in each time unit (subframe) is repeated in L consecutive subframes in one sending cycle. After content in $$\left\lfloor\frac{B}{2L}\right\rfloor * L$$

subframes is sent in one sending cycle of the $$\left\lfloor\frac{B}{2L}\right\rfloor * L$$

subframes (that is, $$\left\lfloor\frac{B}{2L}\right\rfloor * L * 2$$

slots), the sending cycle is repeated for R2/L times. It should be noted herein that RVs of different sending cycles may be different. For example, an RV of a $j^{th}$ sending cycle is $\mathrm{rv}_{idx}(j)=2g \bmod (\mathrm{rv}_{DCI}+j,2)$, where $\mathrm{rv}_{DCI}$ is initial RV, and may be indicated in a RAR or DCI.

However, in some cases, Tmax indicated by the network device may be greater than a transport block size required by the terminal device to transmit the data. To avoid a waste of resources and reduce power consumption of the terminal, the network device usually supports the terminal device in selecting Ts (indicating a transport block size actually used by the terminal device to send the data) less than Tmax to transmit the data. When the network device schedules an uplink resource for the terminal device, the indicated repetition quantity R1 corresponds to Tmax indicated by the network device. In other words, when a transport block size used by the terminal device to transmit the data is Tmax (Ts=Tmax), the terminal device may send the data based on R1 (using R1 as a repetition quantity for sending). If Ts actually used by the terminal device to transmit the data is less than Tmax, the terminal device reduces R1 to reduce sending power consumption of the terminal device. In other words, a repetition quantity R (assumed to be R2) actually used by the terminal device may be less than R1, and may be calculated according to a preset rule.

When selected Ts is less than Tmax, according to an existing mechanism, a value of L is determined based on the repetition quantity R2 actually used by the terminal device, and a relationship between R2 and L satisfies L=min (4,⌈R2/2⌉), where ⌈ ⌉ represents rounding up. When Ts selected by the terminal is different, R2 changes accordingly, and the value of L may also change. When L changes, a length of the sending cycle also changes.

Figure 2:
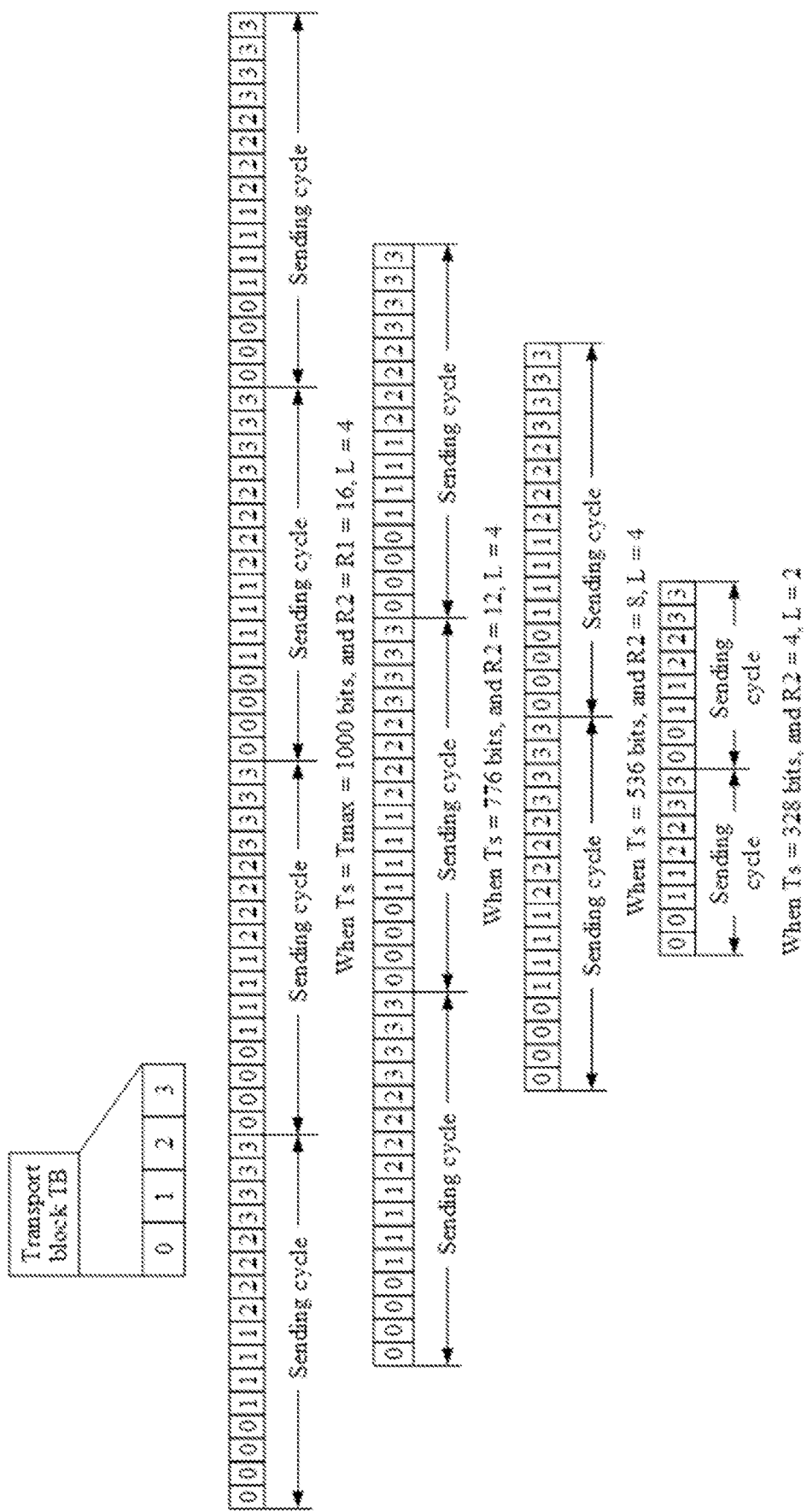
FIG. 2 is a schematic diagram of values of a cyclic parameter L in the prior art.

For example, as shown in FIG. 2, it is assumed that a transport block used by the terminal device to transmit the data is mapped to four time units, and content carried in the four time units is represented by 0, 1, 2, and 3. When Ts=Tmax=1000 bits (bits), and R2=R1=16, L=4, one sending cycle includes 4*4=16 time units, and there are four sending cycles in total. In one sending cycle, the content 0, 1, 2, and 3 each are repeated in four consecutive time units.

When Ts=776 bits, and R2 corresponding to Ts is 12, L=4, one sending cycle includes 4*4=16 time units, and there are three sending cycles in total. In one sending cycle, the content 0, 1, 2, and 3 each are repeated in four consecutive time units.

When Ts=536 bits, and R2=8, L=4, one sending cycle includes 4*4=16 time units, and there are two sending cycles in total. In one sending cycle, the content 0, 1, 2, and 3 each are repeated in four consecutive time units.

When Ts=328 bits, and R2=4, L=2, one sending cycle includes 4*2=8 time units, and there are two sending cycles in total. In one sending cycle, the content 0, 1, 2, and 3 each are repeated in two consecutive time units.

It can be learned that when Ts=328 bits, a value of L and a length of the sending cycle are different from those when Ts=1000 bits, Ts=776 bits, and Ts=328 bits. Because the network device does not know a specific value of Ts, when receiving the data sent by the terminal device, the network device needs to assume, based on different values of Ts, values of L and lengths of the sending cycle that correspond to different values of Ts, and attempt to perform signal combination and demodulation on the data sent by the terminal. This causes relatively high processing complexity and receiving overheads of the network device in a process of receiving the data.

In view of this, this application provides a data transmission method. Values of L are the same regardless of a value of Ts used by the terminal device to transmit the data, and the network device does not need to assume different cyclic parameters L to process received data. This reduces processing complexity and receiving overheads of the network device in a process of receiving the data.

Figure 3:
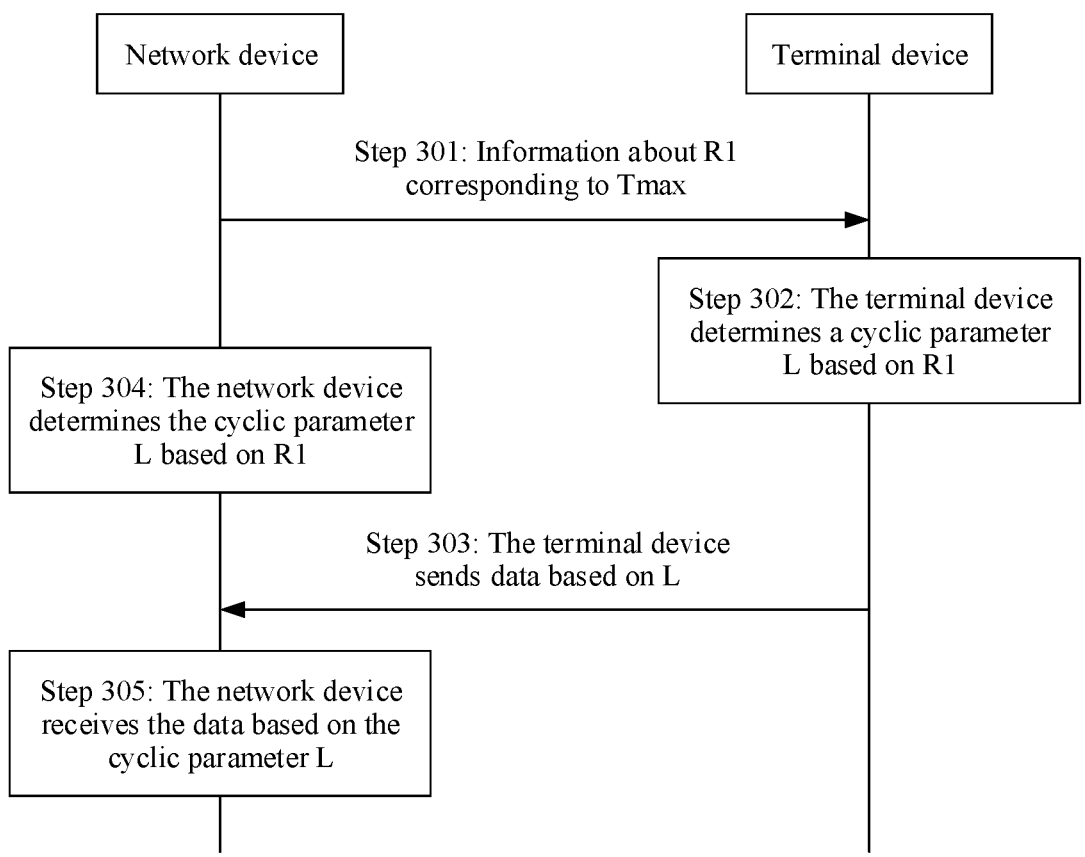
FIG. 3 is a flowchart 1 of an embodiment of a data transmission method according to this application.

FIG. 3 is a flowchart of an embodiment of a data transmission method according to this application. The method includes the following steps.

Step 301: A network device sends, to a terminal device, information about a repetition quantity R1 corresponding to Tmax.

The information about R1 may directly indicate a value of R1, or may be an index, and the terminal device may determine, based on a preset correspondence, a value of R1 corresponding to the index.

Step 302: The terminal device determines a cyclic parameter L based on R1.

In this application, after obtaining R1 indicated by the network device, the terminal device may determine L based on R1. For example, R1 and L may satisfy L=min (K, ⌈R1/2⌉), where K is a preset constant, and indicates an allowed maximum value.

Optionally, R1 and L may alternatively satisfy the following relationship: when R1≥M, L=min(K,⌈R1/2⌉) ; or when R1<M, L=1; where M is a preset threshold, for example, M=8.

In another embodiment of this application, the terminal device determines the cyclic parameter L based on a configuration or an indication of the network device. For example, the repetition quantity R1 corresponding to Tmax and the cyclic parameter L are both configured or indicated by the network device.

Step 303: The terminal device sends data based on L.

In this application, because R1 is a repetition quantity specified by the network device, L determined by the terminal device based on R1 is the same regardless of whether Ts used by the terminal is less than Tmax.

In other words, when Ts<Tmax, the cyclic parameter L used by the terminal device is determined based on the repetition quantity R1, and does not vary with Ts.

Step 304: The network device determines L based on R1.

Step 305: The network device receives the data based on the cyclic parameter L.

A specific manner of determining L by the network device based on R1 is the same as a manner of determining L by the terminal device based on R1. Therefore, the network device may clearly learn of a value of L used by the terminal device, and accurately receive, based on the determined L, the data sent by the terminal device. The network device does not need to assume different values of Ts to calculate values of L that may be used by the terminal device, and attempt to receive the data based on the calculated different values of L. This reduces processing complexity and receiving overheads of the network device in a process of receiving the data.

Figure 4:
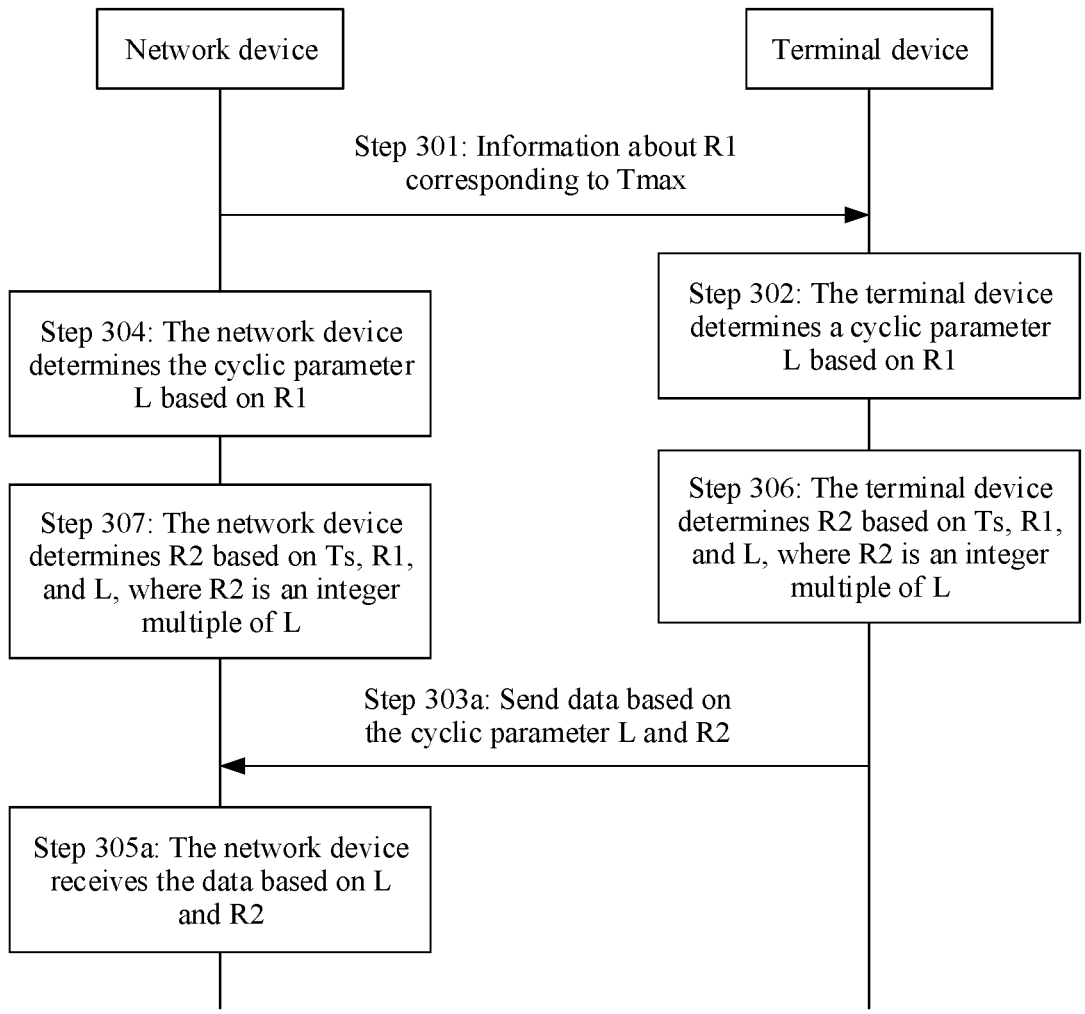
FIG. 4 is a flowchart 2 of an embodiment of a data transmission method according to this application.

Optionally, with reference to FIG. 3, as shown in FIG. 4, before step 303 is performed, the method further includes:

Step 306: The terminal device determines R2 based on Ts, R1, and L, where R2 is an integer multiple of L.

The terminal device may determine Ts based on Tmax and a data volume of to-be-transmitted data.

For example, the terminal may first determine a corresponding TBS set {T1, T2, T3, T4} based on Tmax, and then select, from the set as Ts, a smallest TBS that can carry the data volume of the data. For example, the TBS set corresponding to Tmax may be shown in Table 1.

TABLE 1

| Tmax | 328 | 408 | 504 | 584 | 680 | 808 | 936 | 1000 |
|---|---|---|---|---|---|---|---|---|
| T1 | 328 | 328 | 328 | 328 | 328 | 328 | 328 | 328 |
| T2 |  | 408 | 408 | 408 | 456 | 504 | 504 | 536 |
| T3 |  |  | 504 | 504 | 584 | 680 | 712 | 776 |
| T4 |  |  |  | 584 | 680 | 808 | 936 | 1000 |

It is assumed that Tmax=1000 bits. It can be learned from Table 1 that when Tmax=1000 bits, the TBS set is {T1=328, T2=536, T3=776, T4=1000}. If the terminal device needs to transmit only 400 bits of data, the terminal device may select, as Ts, T2=536 that can carry 400 bits and has a smallest value. This is merely an example herein. The terminal device may alternatively select another TBS greater than 400 bits for sending.

In this example, the terminal device may first perform linear reduction on R1 based on Ts, to obtain a value f(Ts,R1) obtained after the linear reduction.

In an example, f(Ts,R1), Ts, and R1 may satisfy f(Ts,R1)=α*R1, where α is a scaling coefficient corresponding to Ts.

For example, α may be a ratio Ts/Tmax of Ts to Tmax. In other words, f(Ts,R1)=(Ts/Tmax)*R1.

Optionally, α may alternatively be a preset scaling coefficient corresponding to Ts and Tmax. For example, corresponding to Table 1, a value of α may be shown in Table 2.

TABLE 2

| Tmax | 328 | 408 | 504 | 584 | 680 | 808 | 936 | 1000 |
|---|---|---|---|---|---|---|---|---|
| T1 | 1 | 1 | 0.75 | 0.75 | 0.5 | 0.5 | 0.5 | 0.5 |
| T2 |  | 1 | 1 | 0.75 | 0.75 | 0.75 | 0.75 | 0.75 |
| T3 |  |  | 1 | 1 | 1 | 1 | 1 | 1 |
| T4 |  |  |  | 1 | 1 | 1 | 1 | 1 |

It is assumed that Tmax=1000 bits. When Ts=T2, it can be learned from Table 2 that α=0.75.

After determining f(Ts,R1), the terminal device may round f(Ts,R1) based on L, to obtain R2.

For example, the terminal device may round up f(Ts,R1) based on L. In other words, f(Ts,R1) and L may satisfy R2=(L*⌈f(Ts,R1)/L⌉). Alternatively, the terminal device may round down f(Ts,R1) based on L. In other words, f(Ts,R1) and L may satisfy R2=(L*⌊f(Ts,R1)/L⌋). Alternatively, the terminal device may round off f(Ts,R1) based on L. In other words, f(Ts,R1) and L may satisfy $$R2 = \left(L * \left\lfloor \frac{f(Ts, R1)}{L} + 0.5 \right\rfloor \right).$$

In another embodiment of this application, after determining f(Ts,R1), the terminal device may quantize f(Ts,R1) to a power of 2. For example, f(Ts,R1) is quantized to a value in {1, 2, 4, 8, 16, 32, 64, 128}. Proximity quantization may be performed, or f(Ts,R1) may be always quantized to a minimum value greater than f(Ts,R1) or a maximum value less than f(Ts,R1).

f(Ts,R1) is rounded based on L, so that an actual repetition quantity, calculated according to a preset scaling rule, of a transport block whose size is Ts is an integer multiple of L. This can ensure that the terminal device sends the data for a plurality (R2/L) of complete sending cycles, and improve data transmission efficiency. If L is not rounded, there is a possibility that the terminal sends the data for an incomplete sending cycle, causing performance loss.

Further, in this example, step 303 may specifically include:

Step 303a: Send the data based on the cyclic parameter L and R2.

An example in which uplink data is sent on an NPUSCH in NB-IoT is used. A transport block (or a codeword) corresponding to the NPUSCH is mapped to $N_{RU}$ RUs, and one of the $N_{RU}$ RUs corresponds to $N_{slots}^{UL}$ slots in terms of time. Therefore, content of one NPUSCH transport block is mapped to $N_{RU}*N_{slots}^{UL}$ slots.

In this example, it is assumed that R1 is a repetition quantity indicated by the network device, and R2 is an actual repetition quantity corresponding to Ts. The cyclic parameter L is calculated based on R1 instead of R2: L=min (4,⌈R1/2⌉) When the terminal device sends the data based on the cyclic parameter L and R2, the NPUSCH transport block is finally sent in N consecutive NB-IoT uplink slots, where $N=R2*N_{RU}*N_{slots}^{UL}$. For ease of description, the N consecutive uplink slots are numbered and denoted as Ni, where i=0, 1, 2, 3, . . . , or N. During sending, the N slots are divided into R2/L groups, and each group includes B consecutive uplink slots, where $B=L*N_{RU}*N_{slots}^{UL}$. Content that is of the NPUSCH transport block and that is mapped to a $$\left\lfloor \frac{b}{L} \right\rfloor th$$

slot (where b=0, 1, 2, . . . , or B−1) is sent in L uplink slots, and numbers corresponding to the L uplink slots Ni are $$i = jB + 2L\left\lfloor \frac{b}{2L} \right\rfloor + 2l + \mathrm{mod}\left(\left\lfloor \frac{b}{L} \right\rfloor, 2\right), l = 0, 1, \ldots, L-1.$$

In this application, the NPUSCH transport block is mapped to X time units, where the time unit is two slots (that is, one subframe), and X is $$\left\lfloor \frac{B}{2L} \right\rfloor.$$

One sending cycle corresponds to one group in this example. Content carried in each time unit (subframe) is repeated in L consecutive subframes in one sending cycle. After content in $$\left\lfloor \frac{B}{2L} \right\rfloor * L$$

subframes is sent in one sending cycle of the $$\left\lfloor \frac{B}{2L} \right\rfloor * L$$

subframes (that is, $$\left\lfloor \frac{B}{2L} \right\rfloor * L * 2$$

slots), the sending cycle is repeated for R2/L times. It should be noted herein that RVs of different sending cycles may be different. For example, an RV of a $j^{th}$ sending cycle is $rv_{idx}(j) = 2g \bmod(rv_{DCI}+j, 2)$, where $rv_{DCI}$ is an initial RV, and may be indicated in a RAR or DCI.

Correspondingly, the network device may calculate R2 in a same manner as the terminal device does. Before step 305, the method further includes the following steps.

Step 307: The network device determines R2 based on Ts, R1, and L, where R2 is an integer multiple of L.

In this example, step 305 may specifically include:

Step 305*a*: The network device receives the data based on L and R2.

It should be noted that when the network device calculates R2, because the network device cannot learn of Ts used by the terminal device, the network device needs to assume a value of Ts, and then calculate R2 based on different values. If the data sent by the terminal device can be correctly received based on R2 calculated based on an assumed value of Ts, it indicates that the assumed value of Ts is Ts used by the terminal device. When assuming the value of Ts, the network device may alternatively determine an assumed range based on the TBS set corresponding to Tmax.

In an example, the data transmission method in FIG. 3 and FIG. 4 may be specifically applied to an early data transmission (EDT) during random access procedure mechanism during a random access procedure. The EDT mechanism supports the terminal device in transmitting data during the random access procedure without establishing an RRC connection. This avoids signaling interaction for establishing the RRC connection. The EDT mechanism is very applicable to data, with a small data volume, in an uplink non-access stratum (NAS) protocol data unit (PDU).

Figure 5:
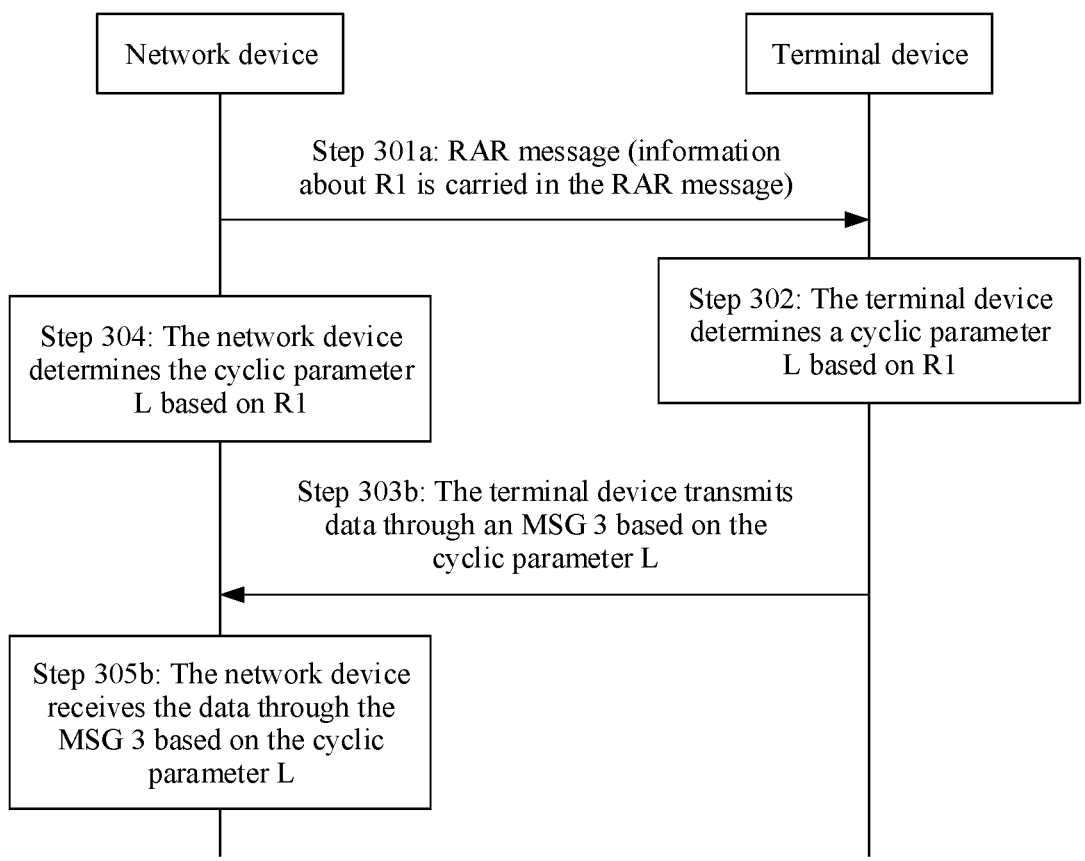
FIG. 5 is a flowchart 3 of an embodiment of a data transmission method according to this application.

For example, with reference to FIG. 3, as shown in FIG. 5, step 301 may specifically include the following step:

Step 301*a*: The network device sends a random access response (RAR) message to the terminal device, where the information about R1 is carried in the RAR message.

In the EDT mechanism, the terminal device sends a physical random access channel (PRACH) preamble sequence to the network device on a specific PRACH preamble sequence resource. The PRACH preamble sequence may be referred to as a first message (an MSG 1) during the random access procedure.

The specific PRACH preamble sequence resource is specially used for early data transmission (EDT). In this case, the terminal device sends the data during the random access procedure.

The network device detects the preamble sequence on the specific PRACH preamble sequence resource, determines that data transmission is EDT, and determines to send a second message (an MSG 2) to the terminal device during the random access procedure. The MSG 2 includes the RAR message for the terminal device. Because the network device cannot determine a volume of the data to be sent by the terminal device, the network device allocates an uplink resource based on Tmax that is broadcast through a system message, and allocates, through the RAR message in the MSG 2 by using an uplink grant (UL grant), a resource and the repetition quantity R1 that are to be used by the terminal device to send a third message (an MSG 3).

After receiving the RAR message, the terminal device maps, according to a preset rule, Tmax to n TBSs that may be sent over the allocated resource: T1, T2, . . . , Tn. For example, the preset rule may be shown in Table 1. When a maximum TBS allowed to be used to transmit the MSG 3 and configured in the system message is 1000, a TBS set to which the terminal device maps Tmax according to the preset rule is {328, 536, 776, 1000}.

The terminal device selects, based on the volume of the to-be-sent data, a most appropriate TBS from the n TBSs {T1, T2, . . . , Tn} that may be sent as a target TBS (which may be denoted as a selected TBS, namely, Ts), where Ts is used to send a message in the MSG 3.

Specifically, the terminal device may select a TBS with a smallest padding ratio to send the MSG 3. In addition, the MSG 3 includes a terminal ID of the terminal device and a NAS PDU of the to-be-sent data.

Step 303 may specifically include the following step:

Step 303*b*: The terminal device transmits the data through the third message, namely, the MSG 3, during the random access procedure based on the cyclic parameter L.

After determining the cyclic parameter L, the terminal device may send the MSG 3 on a physical uplink shared channel based on Ts.

An example in which the MSG 3 is sent on an NPUSCH in NB-IoT is used. A transport block (or a codeword) corresponding to the MSG 3 is mapped to $N_{RU}$ RUs, and one of the $N_{RU}$ RUs corresponds to slots in terms of time. Therefore, content of an NPUSCH transport block corresponding to one MSG 3 is mapped to $N_{RU}*N_{slots}^{UL}$ slots.

In this example, it is assumed that R1 is a repetition quantity indicated by the network device, and R2 is an actual repetition quantity corresponding to Ts. The cyclic parameter L is calculated based on R1 instead of R2: L=min (4,⌈R1/2⌉). When the terminal device sends the data based on the cyclic parameter L and R2, the NPUSCH transport block is finally sent in N consecutive NB-IoT uplink slots, where $N=R2*N_{RU}*N_{slots}^{UL}$. For ease of description, the N consecutive uplink slots are numbered and denoted as Ni, where i=0, 1, 2, 3, . . . , or N. During sending, the N slots are divided into R2/L groups, and each group includes B consecutive uplink slots, where $B=L*N_{RU}*N_{slots}^{UL}$. Content that is of the NPUSCH transport block and that is mapped to a $$\left\lfloor \frac{b}{L} \right\rfloor th$$

slot (where b=0, 1, 2, . . . , or B−1) is sent in L uplink slots, and numbers corresponding to the L uplink slots Ni are $$i = jB + 2L\left\lfloor \frac{b}{2L} \right\rfloor + 2l + \mathrm{mod}\left(\left\lfloor \frac{b}{L} \right\rfloor, 2\right), l = 0, 1, \ldots, L-1.$$

In this example, the transport block corresponding to the MSG 3 is mapped to X time units, where the time unit is two slots (that is, one subframe), and X is $$\left\lfloor \frac{B}{2L} \right\rfloor.$$

One sending cycle corresponds to one group in this example. Content carried in each time unit (subframe) is repeated in L consecutive subframes in one sending cycle. After content in $$\left\lfloor \frac{B}{2L} \right\rfloor *L$$

subframes is sent in one sending cycle of the $$\left\lfloor \frac{B}{2L} \right\rfloor *L$$

subframes (that is, $$\left\lfloor \frac{B}{2L} \right\rfloor *L*2$$

slots), the sending cycle is repeated for R2/L times. It should be noted herein that RVs of different sending cycles may be different. For example, an RV of a $j^{th}$ sending cycle is $rv_{idx}(j)=2g\ \mathrm{mod}(rv_{DCI}+j,2)$, where $rv_{DCI}$ is an initial RV, and may be indicated in a RAR or DCI.

Correspondingly, step 305 may specifically include the following step:

Step 305b: The network device receives the data through the MSG 3 based on the cyclic parameter L.

Figure 6A:
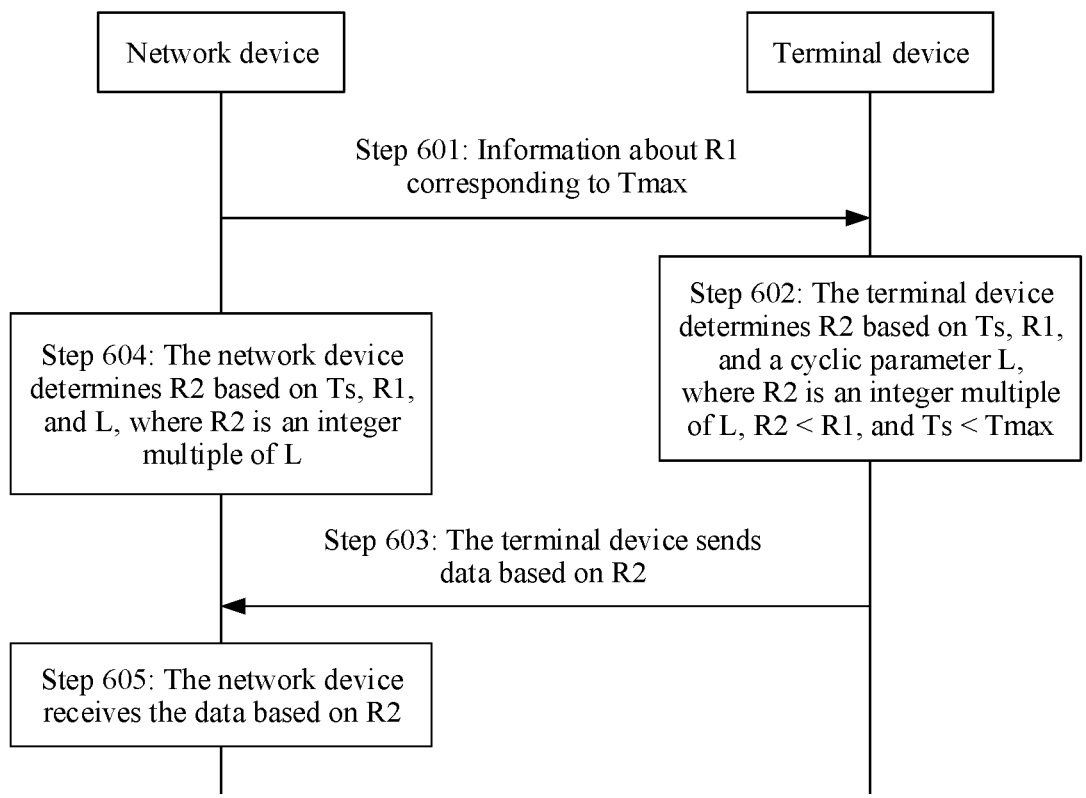
FIG. 6A is a flowchart 4 of an embodiment of a data transmission method according to this application.

FIG. 6A is a flowchart of another embodiment of a data transmission method according to this application. The method provides a method for reducing R1, so that when Ts is less than Tmax, a terminal device can reduce R1 to obtain R2 (where R2<R1), to reduce sending power consumption of the terminal. The method includes the following steps.

Step 601: A network device sends, to the terminal device, information about a repetition quantity R1 corresponding to Tmax.

Step 602: The terminal device determines R2 based on Ts, R1, and a cyclic parameter L, where R2 is an integer multiple of L, R2<R1, and Ts<Tmax.

In this example, for a manner of determining Ts by the terminal device, refer to the manner of determining Ts by the terminal device in the embodiment shown in FIG. 5. Details are not described herein again.

For a manner of determining the cyclic parameter L, refer to the manner in which the terminal determines L based on R1 in the embodiment shown in FIG. 3. Details are not described herein again.

Alternatively, in this example, the cyclic parameter L may be a preset fixed value.

After determining Ts and L, the terminal device may determine R2 based on Ts, R1, and L. For a specific manner of determining R2 based on Ts, R1, and L, refer to the manner of determining R2 based on Ts, R1, and L by the terminal device in the embodiment shown in FIG. 5. Details are not described herein again.

Step 603: The terminal device sends data based on R2.

When sending the data, the terminal device may specifically send the data based on L and R2. For example, for specific implementation of sending the data by the terminal device based on L and R2, refer to the foregoing description of step 303a. Details are not described herein again.

Step 604: The network device determines R2 based on Ts, R1, and L, where R2 is an integer multiple of L.

A value of Ts may be assumed by the network device. The network device may determine a TBS set based on Tmax, and then may successively assume that values of TBSs in the TBS set are Ts.

For a specific manner in which the network device determines L and determines R2 based on Ts, R1, and L, refer to the manner in which the terminal device determines L and determines R2 based on Ts, R1, and L in step 602. Details are not described herein again.

Step 605: The network device receives the data based on R2.

When receiving the data, the network device may specifically receive the data based on L and R2.

According to the data transmission method shown in FIG. 6A, a method for obtaining R2 (where R2<R1) by reducing R1 when Ts<Tmax is provided, to reduce the sending power consumption of the terminal device.

Figure 6B:
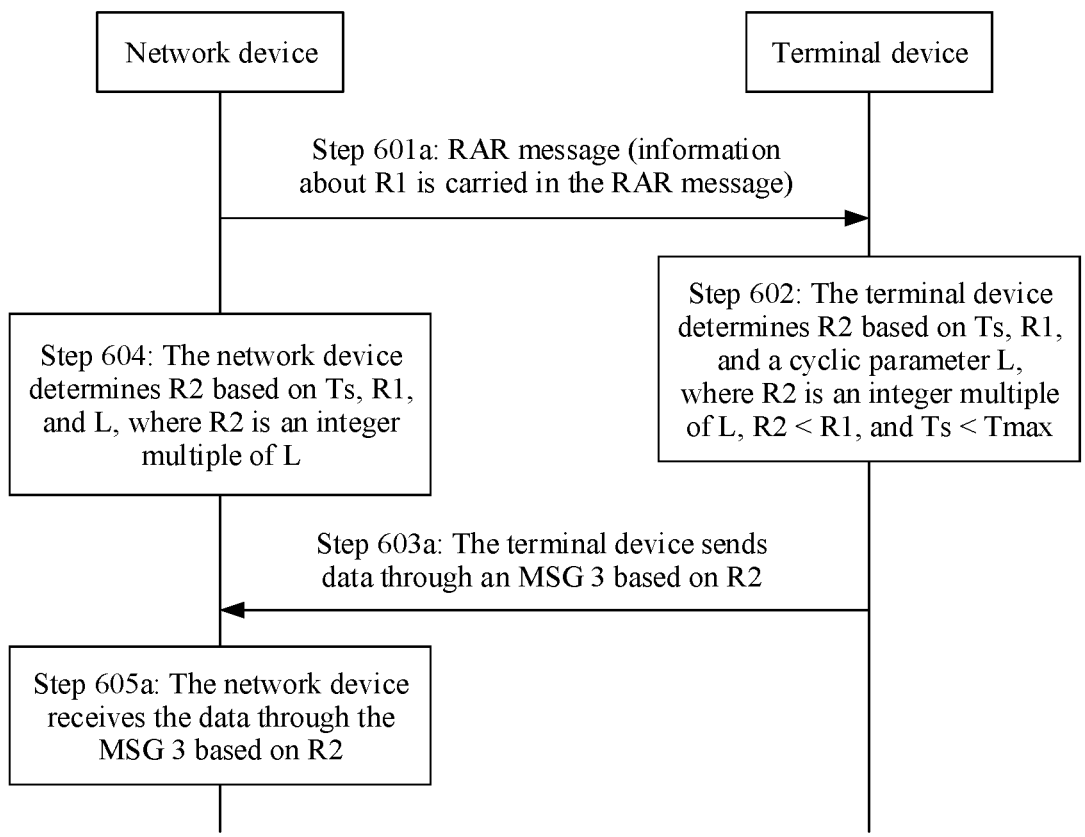
FIG. 6B is a flowchart 5 of an embodiment of a data transmission method according to this application.

It should be noted that the data transmission method shown in FIG. 6A may also be applied to an EDT RACH mechanism. For example, as shown in FIG. 6B, step 601 may specifically include the following step:

Step 601a: The network device sends a RAR message to the terminal device, where the information about R1 is carried in the RAR message.

Step 603 may specifically include the following step:

Step 603a: The terminal device sends the data through an MSG 3 based on R2.

Specifically, the terminal device may send the data through the MSG 3 based on R2 and L. For specific implementation of sending the data by the terminal device based on L and R2, refer to the foregoing description of step 303b. Details are not described herein again.

Step 605 may specifically include the following step:

Step 605a: The network device receives the data through the MSG 3 based on R2.

When receiving the data through the MSG 3, the network device receives the data based on R2 and L.

The foregoing mainly describes the solutions provided in this application from a perspective of interaction between the network elements. It may be understood that to implement the foregoing functions, the terminal device and the network device each include a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 7:
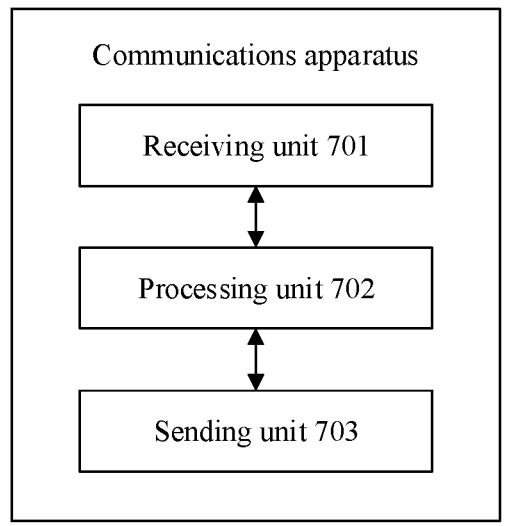
FIG. 7 is a schematic structural diagram of a communications apparatus according to this application.

FIG. 7 is a possible schematic structural diagram of a communications apparatus according to this application. The communications apparatus includes a receiving unit 701, a processing unit 702, and a sending unit 703.

The communications apparatus may be a functional module integrated on a terminal device or an external apparatus connected to the terminal device. When the communications apparatus runs, the terminal device can implement the data transmission method in FIG. 3 to FIG. 5, or implement the data transmission method in FIG. 6A and FIG. 6B.

When the communications apparatus runs, the terminal device implements the data transmission method in FIG. 3 to FIG. 5.

The receiving unit 701 is configured to receive information about a repetition quantity R1 corresponding to Tmax, where Tmax is a maximum transport block size allowed to be used to transmit data.

The processing unit 702 is configured to determine a cyclic parameter L based on R1. The cyclic parameter L indicates that content carried in each of a plurality of time units to which a transport block used to transmit the data is mapped is repeated in L consecutive time units, where a size of the transport block used to transmit the data is Ts, and Ts<Tmax.

The sending unit 703 is configured to transmit the data based on the cyclic parameter L.

Optionally, that the processing unit 702 determines the cyclic parameter L based on R1 satisfies:

L=min (K,⌈R1/2⌉), where min represents taking a minimum value, K is a preset constant, and ⌈ ⌉ represents rounding up.

Optionally, the processing unit 702 is further configured to: before the sending unit 703 transmits the data based on the cyclic parameter L, determine R2 based on Ts, R1, and L, where R2 is an integer multiple of L, and R2 is a total quantity of repeated transmissions of the content carried in each time unit when the data is sent.

The sending unit 703 is specifically configured to send the data based on the cyclic parameter L and R2.

Optionally, that the processing unit 702 determines R2 based on Ts, R1, and L satisfies R2=(L*⌈f(Ts,R1)/L⌉), where ⌈ ⌉ represents rounding up.

Optionally, f(Ts,R1) satisfies f(Ts,R1)=(Ts/Tmax)*R1.

Optionally, the receiving unit 701 is specifically configured to receive a random access response RAR message, where the information about R1 is carried in the RAR message.

The sending unit 703 is specifically configured to transmit the data through a third message, namely, an MSG 3, during a random access procedure based on the cyclic parameter L.

When the communications apparatus runs, the terminal device implements the data transmission method in FIG. 6A and FIG. 6B.

The receiving unit 701 is configured to receive information about a repetition quantity R1 corresponding to Tmax, where Tmax is a maximum transport block size allowed to be used to transmit data.

The processing unit 702 is configured to determine R2 based on Ts, R1, and a cyclic parameter L, where R2 is an integer multiple of L. The cyclic parameter L indicates that content carried in each of a plurality of time units to which a transport block used to transmit the data is mapped is repeated in L consecutive time units. R2 is a total quantity of repeated transmissions of the content carried in each time unit when the data is sent. A size of the transport block used to transmit the data is Ts, Ts<Tmax, and R2<R1.

The sending unit 703 is configured to send the data based on R2.

That the processing unit 702 determines R2 based on Ts, R1, and L satisfies R2=(L*⌈f(Ts,R1)/L⌉), where ⌈ ⌉ represents rounding up.

Optionally, f(Ts,R1) satisfies f(Ts,R1)=(Ts/Tmax)*R1.

Optionally, a value of the cyclic parameter L is fixed, or is determined based on R1.

Optionally, determining the cyclic parameter L based on R1 satisfies L=min(K,⌈R1/2⌉), where min represents taking a minimum value, and K is a preset constant.

The communications apparatus may be a functional module integrated on a network device or an external apparatus connected to the network device. When the communications apparatus runs, the network device can implement the data transmission method in FIG. 3 to FIG. 5, or implement the data transmission method in FIG. 6A and FIG. 6B.

When the communications apparatus runs, the network device implements the data transmission method in FIG. 3 to FIG. 5.

The sending unit 703 is configured to send, to a terminal device, information about a repetition quantity R1 corresponding to Tmax, where Tmax is a maximum transport block size allowed to be used.

The processing unit 702 is configured to determine a cyclic parameter L based on R1. The cyclic parameter L indicates that content carried in each of a plurality of time units to which a transport block used to transmit data is mapped is repeated in L consecutive time units, where a size of the transport block used to transmit the data is Ts, and Ts<Tmax.

The receiving unit 701 is configured to receive the data based on the cyclic parameter L.

Optionally, that the processing unit 702 determines the cyclic parameter L based on R1 satisfies L=min (K,⌈R1/2⌉), where min represents taking a minimum value, and K is a preset constant.

Optionally, the processing unit 702 is further configured to: before the receiving unit 701 receives the data based on the cyclic parameter L, determine R2 based on Ts, R1, and L, where R2 is an integer multiple of L, and R2 is a total quantity of repeated transmissions of the content carried in each time unit when the terminal device sends the data.

The receiving unit 701 is specifically configured to receive the data based on the cyclic parameter L and R2.

Optionally, that the processing unit 702 determines R2 based on Ts, R1, and L satisfies R2=(L*⌈f(Ts,R1)/L⌉), where ⌈ ⌉ represents rounding up.

Optionally, f(Ts,R1) satisfies f(Ts,R1)=(Ts/Tmax)*R1.

Optionally, the sending unit 703 is specifically configured to send a random access response RAR message to the terminal device, where the information about R1 is carried in the RAR message.

The receiving unit 701 is specifically configured to receive the data through a third message, namely, an MSG 3, during a random access procedure based on the cyclic parameter L.

When the communications apparatus runs, the network device implements the data transmission method in FIG. 6A and FIG. 6B.

The sending unit 703 is configured to send, to a terminal device, information about a repetition quantity R1 corresponding to Tmax, where Tmax is a maximum transport block size allowed to be used to transmit data.

The processing unit 702 is configured to calculate R2 based on Ts, R1, and a cyclic parameter L, where R2 is an integer multiple of L. The cyclic parameter L indicates that content carried in each of a plurality of time units to which a transport block used to transmit the data is mapped is repeated in L consecutive time units. R2 is a total quantity of repeated transmissions of the content carried in each time unit when the data is sent. A size of the transport block used to transmit the data is Ts, Ts<Tmax, and R2<R1.

The receiving unit 701 is configured to receive the data based on R2.

Optionally, the determining R2 based on Ts, R1, and L satisfies R2=(L*⌈f(Ts,R1)/L⌉), where ⌈ ⌉ represents rounding up.

Optionally, f(Ts,R1) satisfies f(Ts,R1)=(Ts/Tmax)*R1.

Optionally, a value of the cyclic parameter L is fixed, or is determined based on R1.

Optionally, determining the cyclic parameter L based on R1 satisfies L=min (K,⌈R1/2⌉), where min represents taking a minimum value, and K is a preset constant.

Figure 8:
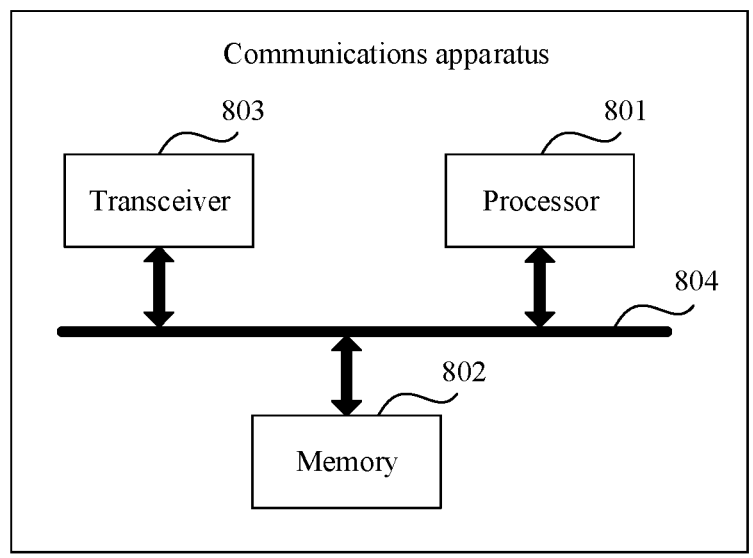
FIG. 8 is a schematic structural diagram of another communications apparatus according to this application.

FIG. 8 is a schematic structural diagram of a communications apparatus according to this application. The communications apparatus includes a processor 801 and a memory 802.

The processor 801 may be a central processing unit (CPU), a general-purpose processor 801, a digital signal processor (DSP), an application-specific integrated circuit (ASIC), a field programmable gate array (FPGA) or another programmable logic device, a transistor logic device, a hardware component, or any combination thereof. The processor 801 may implement or execute various example logical blocks, modules, and circuits described with reference to content disclosed in this application. Alternatively, the processor 801 may be a combination of processors implementing a computing function, for example, a combination of one or more microprocessors, or a combination of the DSP and a microprocessor.

Optionally, the communications apparatus may further include a transceiver 803, configured to support the communications apparatus in sending and receiving data, signaling, or information in the foregoing data transmission method, for example, sending or receiving the information about R1, sending or receiving the data, or the like.

Optionally, the communications apparatus may be a terminal device, or may be a part of an apparatus in a terminal device, for example, a chip system in the terminal device. Optionally, the chip system is configured to support the terminal device in implementing functions in the foregoing aspects, for example, generating, receiving, sending, or processing data and/or information in the foregoing methods. In a possible design, the chip system further includes a memory, and the memory is configured to store a program instruction and data that are necessary for the terminal device. The chip system includes a chip, and may further include another discrete device or circuit structure.

The processor 801, the transceiver 803, and the memory 802 are connected to each other through a bus 804. The bus 804 may be a peripheral component interconnect (PCI) bus 804, an extended industry standard architecture (EISA) bus 804, or the like. The bus 804 may be classified as an address bus, a data bus, a control bus, or the like. For ease of representation, only one thick line is used to represent the bus 804 in FIG. 8, but this does not mean that there is only one bus or only one type of bus.

The processor 801 is configured to couple to the memory 802, and read and execute instructions in the memory 802, to implement: receiving information about a repetition quantity R1 corresponding to Tmax, where Tmax is a maximum transport block size allowed to be used to transmit data; determining a cyclic parameter L based on R1, where the cyclic parameter L indicates that content carried in each of a plurality of time units to which a transport block used to transmit the data is mapped is repeated in L consecutive time units, and wherein a size of the transport block used to transmit the data is Ts, and Ts<Tmax; and transmitting the data based on the cyclic parameter L.

Optionally, the determining a cyclic parameter L based on R1 satisfies L=min (K,⌈R1/2⌉), where min represents taking a minimum value, and K is a preset constant.

Optionally, before transmitting the data based on the cyclic parameter L, the processor 801 further determines R2 based on Ts, R1, and L, where R2 is an integer multiple of L, and R2 is a total quantity of repeated transmissions of the content carried in each time unit when the data is sent. The transmitting the data based on the cyclic parameter L includes: transmitting the data based on the cyclic parameter L and R2.

Optionally, the determining R2 based on Ts, R1, and L satisfies R2=(L*⌈f(Ts,R1)/L⌉), where ⌈ ⌉ represents rounding up.

Optionally, f(Ts,R1) satisfies f(Ts,R1)=(Ts/Tmax)*R1.

Optionally, the receiving information about a repetition quantity R1 corresponding to Tmax includes: receiving a random access response RAR message, where the information about R1 is carried in the RAR message. The transmitting the data based on the cyclic parameter L includes: transmitting the data through a third message, namely, an MSG 3, during a random access procedure based on the cyclic parameter L.

Alternatively, the processor 801 is configured to couple to the memory 802, and read and execute instructions in the memory 802, to implement: receiving information about a repetition quantity R1 corresponding to Tmax, where Tmax is a maximum transport block size allowed to be used to transmit data; determining R2 based on Ts, R1, and a cyclic parameter L, where R2 is an integer multiple of L, the cyclic parameter L indicates that content carried in each of a plurality of time units to which a transport block used to transmit the data is mapped is repeated in L consecutive time units, R2 is a total quantity of repeated transmissions of the content carried in each time unit when the data is sent, a size of the transport block used to transmit the data is Ts, Ts<Tmax, and R2<R1; and sending the data based on R2.

That the processing unit 1302 determines R2 based on Ts, R1, and L satisfies R2=(L*⌈f(Ts,R1)/L⌉), where ⌈ ⌉ represents rounding up.

Optionally, f(Ts,R1) satisfies f(Ts,R1)=(Ts/Tmax)*R1.

Optionally, a value of the cyclic parameter L is fixed, or is determined based on R1.

Optionally, determining the cyclic parameter L based on R1 satisfies L=min (K,⌈R1/2⌉), where min represents taking a minimum value, and K is a preset constant.

Optionally, the communications apparatus may be a network device, or may be a part of an apparatus in a network device, for example, a chip system in the network device. Optionally, the chip system is configured to support the network device in implementing functions in the foregoing aspects, for example, generating, receiving, sending, or processing data and/or information in the foregoing methods. In a possible design, the chip system further includes a memory, and the memory is configured to store a program instruction and data that are necessary for the network device. The chip system includes a chip, and may further include another discrete device or circuit structure. In this case, the processor 801 is configured to couple to the memory 802, and read and execute instructions in the memory 802, to implement: sending, to a terminal device, information about a repetition quantity R1 corresponding to Tmax, where Tmax is a maximum transport block size allowed to be used; determining a cyclic parameter L based on R1, where the cyclic parameter L indicates that content carried in each of a plurality of time units to which a transport block used to transmit data is mapped is repeated in L consecutive time units, and wherein a size of the transport block used to transmit the data is Ts, and Ts<Tmax; and receiving the data based on the cyclic parameter L.

Optionally, the determining a cyclic parameter L based on R1 satisfies L=min (K,⌈R1/2⌉), where min represents taking a minimum value, and K is a preset constant.

Optionally, before receiving the data based on the cyclic parameter L, the processor further determines R2 based on Ts, R1, and L, where R2 is an integer multiple of L, and R2 is a total quantity of repeated transmissions of the content carried in each time unit when the terminal device sends the data. The receiving the data based on the cyclic parameter L includes: receiving the data based on the cyclic parameter L and R2.

Optionally, the determining R2 based on Ts, R1, and L satisfies R2=(L*⌈f(Ts,R1)/L⌉), where ⌈ ⌉ represents rounding up.

Optionally, f(Ts,R1) satisfies f(Ts,R1)=(Ts/Tmax)*R1.

Optionally, the sending, to a terminal device, information about a repetition quantity R1 corresponding to Tmax includes: sending a random access response RAR message to the terminal device, where the information about R1 is carried in the RAR message. The receiving the data based on the cyclic parameter L includes: receiving the data through a third message, namely, an MSG 3, during a random access procedure based on the cyclic parameter L.

Alternatively, the processor 801 is configured to couple to the memory 802, and read and execute instructions in the memory 802, to implement: sending, to a terminal device, information about a repetition quantity R1 corresponding to Tmax, where Tmax is a maximum transport block size allowed to be used to transmit data; calculating R2 based on Ts, R1, and a cyclic parameter L, where R2 is an integer multiple of L, the cyclic parameter L indicates that content carried in each of a plurality of time units to which a transport block used to transmit the data is mapped is repeated in L consecutive time units, R2 is a total quantity of repeated transmissions of the content carried in each time unit when the data is sent, a size of the transport block used to transmit the data is Ts, Ts<Tmax, and R2<R1; and receiving the data based on R2.

Optionally, the determining R2 based on Ts, R1, and L satisfies R2=(L*⌈f(Ts,R1)/L⌉), where ⌈ ⌉ represents rounding up.

Optionally, f(Ts,R1) satisfies f(Ts,R1)=(Ts/Tmax)*R1.

Optionally, a value of the cyclic parameter L is fixed, or is determined based on R1.

Optionally, determining the cyclic parameter L based on R1 satisfies L=min (K,⌈R1/2⌉), where min represents taking a minimum value, and K is a preset constant.

In one example, method or algorithm steps described in combination with the content disclosed in this application may be implemented by hardware, or may be implemented by a processor executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

During specific implementation, this application further provides a computer storage medium. The computer storage medium may store a program. When the program is executed, some or all of the steps in the embodiments of the data transmission method provided in this application may be performed. The storage medium may be a magnetic disk, an optical disc, a read-only memory (ROM), a random access memory (RAM), or the like.

This application further provides a computer program product including instructions. When the computer program product runs on a computer, the computer is enabled to perform some or all of the steps in the embodiments of the data transmission method provided in this application.

A person skilled in the art may clearly understand that the technologies in this application may be implemented by software in addition to a necessary general hardware platform. Based on such an understanding, the technical solutions of this application essentially or the part contributing to the prior art may be implemented in a form of a software product. The computer software product may be stored in a storage medium, such as a ROM/RAM, a magnetic disk, or an optical disc, and includes instructions for instructing a computer device (which may be a personal computer, a server, a VPN gateway, or the like) to perform the methods described in the embodiments or in some parts of the embodiments of the present invention.

The foregoing descriptions are implementations of the present invention, but are not intended to limit the protection scope of the present invention.

What is claimed is:

1. A data transmission method, wherein the method comprises:
   receiving information about a repetition quantity (R1) corresponding to a maximum transport block size (Tmax) allowed to be used to transmit data;
   determining, based on R1, a cyclic parameter (L) that indicates content carried in each of a plurality of time units to which a transport block used to transmit the data is mapped is repeated in L consecutive time units, wherein a transport block size actually used by a terminal to transmit the data (Ts) is less than Tmax; and
   transmitting the data based on the cyclic parameter (L), wherein the determining a cyclic parameter (L) based on R1 comprises:
   when R1≥8, L=min (K,⌈R1/2⌉),
      wherein:
         K is a preset constant, and
         ⌈ ⌉ represents rounding up; or
   when R1<8, L=1.

2. The method according to claim 1, wherein before the transmitting the data, the method further comprises:
   determining R2 based on Ts, R1, and L,
      wherein:
         R2 is an integer multiple of L, and
         R2 is a total quantity of repeated transmissions of the content carried in each of the plurality of time units when the data is sent; and
   wherein the transmitting the data based on the cyclic parameter (L) comprises:
      transmitting the data based on the cyclic parameter (L) and R2.

3. The method according to claim 2, wherein the determining R2 based on Ts, R1, and L satisfies:
   R2=(L*⌈f(Ts,R1)/L⌉), wherein ⌈ ⌉ represents rounding up.

4. The method according to claim 3, wherein f(Ts,R1) satisfies f(Ts,R1)=(Ts/Tmax)*R1.

5. The method according to claim 1, wherein the receiving information about a repetition quantity (R1) corresponding to Tmax comprises:
   receiving a random access response (RAR) message, wherein the information about R1 is carried in the RAR message; and
   wherein the transmitting the data based on the cyclic parameter (L) comprises:
   transmitting the data through a third message (MSG3), during a random access procedure based on the cyclic parameter (L).

6. The method according to claim 1, wherein the repetition quantity (R1) is a repetition quantity indicated in an uplink resource scheduling message.

7. The method of claim 1, wherein the method is carried out on a terminal device operating as a mobile wireless communication apparatus.

8. A communications apparatus, comprising:
   a processor, and
   a non-transitory computer-readable medium including executable instruction that, when executed by the processor, enable the apparatus to perform the operations of:
   receiving information about a repetition quantity (R1) corresponding to a maximum transport block size (Tmax) allowed to be used to transmit data;
   determining, based on R1, a cyclic parameter (L) that indicates content carried in each of a plurality of time units to which a transport block used to transmit the data is mapped is repeated in L consecutive time units, wherein a transport block size actually used by a terminal to transmit the data (Ts) is less than Tmax; and
   transmitting the data based on the cyclic parameter (L), wherein the determining a cyclic parameter (L) based on R1 comprises:
   when R1≥8, L=min (K,⌈R1/2⌉),
      wherein:
         K is a preset constant, and
         ⌈ ⌉ represents rounding up; or
   when R1<8, L=1.

9. The communications apparatus according to claim 8, wherein before the transmitting the data, the operations further comprise:
   determining R2 based on Ts, R1, and L,
      wherein:
         R2 is an integer multiple of L, and
         R2 is a total quantity of repeated transmissions of the content carried in each of the plurality of time units when the data is sent; and
   wherein the transmitting the data based on the cyclic parameter (L) comprises:
      transmitting the data based on the cyclic parameter (L) and R2.

10. The communications apparatus according to claim 9, wherein the determining R2 based on Ts, R1, and L satisfies:
    R2=(L*⌈f(Ts,R1)/L⌉), wherein ⌈ ⌉ represents rounding up.

11. The communications apparatus according to claim 10, wherein f(Ts,R1) satisfies f(Ts,R1)=(Ts/Tmax)*R1.

12. The communications apparatus according to claim 8, wherein the receiving information about a repetition quantity (R1) corresponding to Tmax comprises:
    receiving a random access response (RAR) message, wherein the information about R1 is carried in the RAR message; and wherein the transmitting the data based on the cyclic parameter (L) comprises:
    transmitting the data through a third message (MSG3), during a random access procedure based on the cyclic parameter (L).

13. The communications apparatus according to claim 8, wherein the repetition quantity (R1) is a repetition quantity indicated in an uplink resource scheduling message.

14. The communications apparatus according to claim 8, wherein the apparatus is a terminal device.

15. A non-transitory computer-readable medium, comprising instructions, that, when executed by processor, facilitate performing the operations of:
   receiving information about a repetition quantity (R1) corresponding to a maximum transport block size (Tmax) allowed to be used to transmit data;
   determining, based on R1, a cyclic parameter (L) that indicates content carried in each of a plurality of time units to which a transport block used to transmit the data is mapped is repeated in L consecutive time units, wherein a transport block size (TBS) actually used by a terminal to transmit the data (Ts) is less than Tmax; and
   transmitting the data based on the cyclic parameter (L), wherein the determining a cyclic parameter (L) based on R1 comprises:
   when R1≥8, L=min (K,⌈R1/2⌉),
      wherein:
         K is a preset constant, and
         ⌈ ⌉ represents rounding up; or
   when R1<8, L=1.

16. The non-transitory computer-readable medium of claim 15, wherein before the transmitting the data, the method further comprises:
determining R2 based on Ts, R1, and L,
wherein:
R2 is an integer multiple of L, and
R2 is a total quantity of repeated transmissions of the content carried in each of the plurality of time units when the data is sent; and
wherein the transmitting the data based on the cyclic parameter (L) comprises:
transmitting the data based on the cyclic parameter (L) and R2.

17. The non-transitory computer-readable medium of claim 16, wherein the determining R2 based on Ts, R1, and L satisfies:
R2=(L*⌈f(Ts,R1)/L⌉), wherein ⌈ ⌉ represents rounding up.

18. The non-transitory computer-readable medium of claim 17, wherein f(Ts,R1) satisfies f(Ts,R1)=(Ts/Tmax)*R1.

19. The non-transitory computer-readable medium of claim 15, wherein the receiving information about a repetition quantity (R1) corresponding to Tmax comprises:
receiving a random access response (RAR) message, wherein the information about R1 is carried in the RAR message; and
wherein the transmitting the data based on the cyclic parameter (L) comprises:
transmitting the data through a third message (MSG3), during a random access procedure based on the cyclic parameter (L).

20. The non-transitory computer-readable medium of claim 15, wherein the repetition quantity (R1) is a repetition quantity indicated in an uplink resource scheduling message.

* * * * *

UNITED STATES PATENT AND TRADEMARK OFFICE
CERTIFICATE OF CORRECTION

PATENT NO. : 11,419,142 B2
APPLICATION NO. : 17/095491
DATED : August 16, 2022
INVENTOR(S) : Tie et al.

Page 1 of 1

It is certified that error appears in the above-identified patent and that said Letters Patent is hereby corrected as shown below:

In the Claims

Claim 15: Column 22, Line 57: "wherein a transport block size (TBS) actually used by" should read -- wherein a transport block size actually used by --.

Signed and Sealed this
Twenty-seventh Day of December, 2022

Katherine Kelly Vidal
*Director of the United States Patent and Trademark Office*